United States Patent

Ibbott

[11] 4,089,312
[45] May 16, 1978

[54] MEANS FOR INTRODUCING ADDITIONAL AIR INTO AIR FUEL STREAM OF INTERNAL COMBUSTION ENGINES

[76] Inventor: Jack Kenneth Ibbott, 4-17-7 Nishi Azabu, Minato-ku, Tokyo, Japan

[21] Appl. No.: 610,885

[22] Filed: Sep. 5, 1975

[30] Foreign Application Priority Data

Sep. 2, 1975 Japan ............................. 50-106475

[51] Int. Cl.² .......................................... F02M 23/00
[52] U.S. Cl. ............................. 123/119 D; 123/24 R; 261/63
[58] Field of Search ................. 123/119 D, 124 R; 261/63, 98 R; 48/180 A

[56] References Cited

U.S. PATENT DOCUMENTS

| 975,406 | 11/1910 | Fogler | 123/119 D |
|---|---|---|---|
| 1,029,898 | 6/1912 | Stewart | 123/119 D |
| 1,036,302 | 8/1912 | Miller | 123/119 D |
| 1,118,865 | 11/1914 | Johnston et al. | 123/119 D |
| 1,128,470 | 2/1915 | MacDonald | 123/119 D |
| 1,238,523 | 8/1917 | Keegan et al. | 123/119 D |
| 1,479,560 | 1/1924 | Stockman | 123/119 D |
| 1,942,187 | 1/1934 | Ruffino | 123/119 D |

FOREIGN PATENT DOCUMENTS

405,748 12/1943 Italy ............................. 123/119 D

*Primary Examiner*—Charles J. Myhre
*Assistant Examiner*—Ira S. Lazarus
*Attorney, Agent, or Firm*—Wenderoth, Lind & Ponack

[57] ABSTRACT

An intake passage between a carburetor and combustion chambers is provided with small openings along the periphery thereof for communicating the intake passage with the atmosphere. Each opening restricts the introduction of air to a small volume insufficient to cause cross turbulence of air-fuel stream in the intake passage, and the sum total area of the openings is made not to exceed 30% of the total air intake area for the carburetor.

22 Claims, 6 Drawing Figures

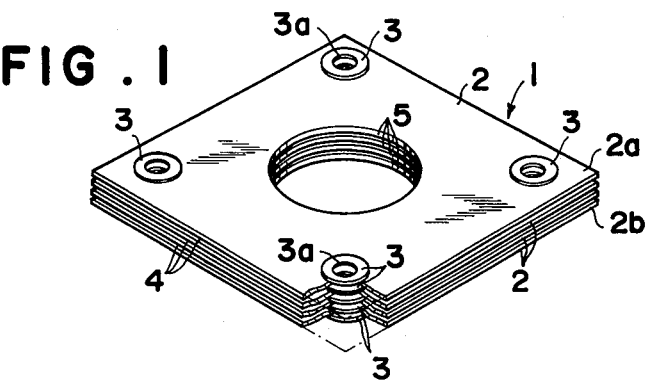
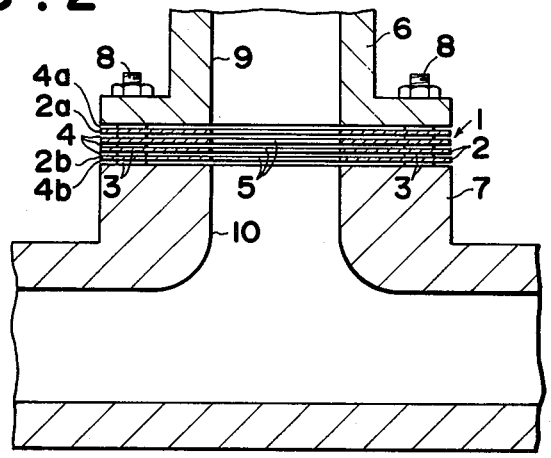
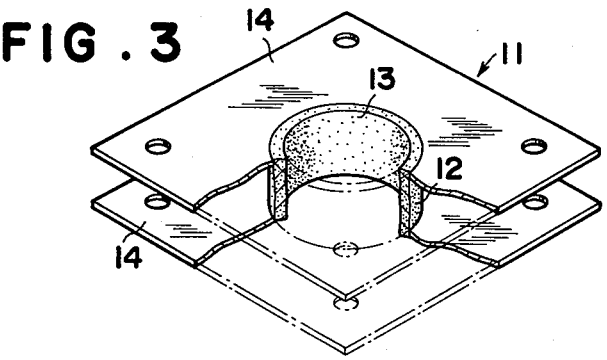

MEANS FOR INTRODUCING ADDITIONAL AIR INTO AIR FUEL STREAM OF INTERNAL COMBUSTION ENGINES

BACKGROUND OF THE INVENTION

This invention relates to means for introducing additional air into the air-fuel stream of internal combustion engines and, more particularly, to the means set forth above by which more complete combustion of the fuel is obtained to reduce the amount of carbon monoxide CO and hydrocarbon HC to be discharged through an exhaust pipe in an automobile.

In an internal combustion engine, it is the normal procedure that the intake manifold, its connection to the internal combustion chambers, and the connection of the carburetor to the manifold are all made to be perfect seals so that the air is introduced into the intake manifold only from the air intake port of the carburetor. However, such an air intake system does not allow sufficient air to be mixed with the fuel to attain complete combustion, consequently there is an excess of fuel which causes the production of free carbon which is deposited in the upper parts of the combustion chamber and the exhaust pipe and is emitted into the air.

Along with the free carbon there is a large amount of carbon monoxide CO which is the result of burning a carbon compound with insufficient air. At the same time some of the fuel in an unburned condition is emitted from the exhaust of the engine as hydrocarbon gas HC.

In order to eliminate the production of free carbon, carbon monoxide and hydrocarbon, it is a logical fact that more air is necessary to burn all of the fuel used in the internal combustion engine, but there have been physical limitations in the system of fuel introduction to the engine and mixing of the fuel with the air. Further, the air-fuel mixture must be a very intimate mixture.

To obtain a more complete combustion of the fuel, it may be designed to introduce additional air into the air-fuel stream delivered from the carburetor. For this end, if a single air hole having a diameter large enough to introduce sufficient air therethrough is made through the intake manifold, the air entering into the intake manifold will become a jet flow and thereby create a cross turbulence in the air-fuel stream from the carburetor. The term "cross turbulence" used herein means a turbulence in the radial direction of the intake passage. Such a turbulence restricts the normal axial flow of the air-fuel stream and causes instability in the operation of the internal combustion engine. Also, a volume of air from the large air hole will cause a reduction of the intake manifold vacuum to below the operating limits thereof. For the reasons set forth above, the engine will not run with such a hole made through the intake manifold.

Accordingly, an object of the present invention is to provide means for introducing additional air into the air-fuel stream of internal combustion engines for more complete combustion of the fuel, thereby not only reducing the amount of free carbon, carbon monoxide and hydrocarbon to be discharged through engine exhaust, but also improving the engine performance.

BRIEF SUMMARY OF THE INVENTION

From extensive tests and research, an applicant of the it has been found that if the air is admitted to enter into an intake manifold at low velocity and substantially homogeneously from the periphery of the intake passage, cross turbulence does not occur in the air-fuel stream flowing through the intake passage, and that if the sum total area of openings for introducing additional air into the intake manifold does not exceed thirty percent (30%) of the total air intake area for the carburetor, the intake manifold vacuum is not reduced to an objectionable degree and the engine runs smoothly with high engine performance.

To accomplish the above effects in accordance with the present invention, an intake passage between a carburetor and combustion chambers in an internal combustion engine is provided with small openings along the periphery thereof for communicating the intake passage with the external atmosphere. Each opening is made small to restrict the introduction of air to a small volume insufficient to cause cross turbulence of the air-fuel stream, and the sum total area of the openings is made not to exceed 30% of the total air intake area for the carburetor. The maximum critical size of each opening, at which the cross turbulence of the air-fuel stream starts to occur, varies in accordance with the size or performance of the engine and the diameter of the intake passage but may be determined very easily by tests with the knowledge of the present disclosure or may be determined by making equations in which the functions will be the size of the engine, diameter of the intake passage and such.

One of the preferred devices of the present invention comprises a plurality of plate members defining not only a slot-shaped air space between the adjacent plates but also a center opening at the inner ends thereof. The center opening forms a part of the intake passage when the device is installed in the down-stream side of the carburetor. The plates may be stacked in layers to form a series of narrow horizontal peripheral spaces about the intake passage, or the plates may be disposed vertically or angularly to form a series of vertical or angular spaces therebetween and about the intake passage. Each of the spaces restricts the introduction of air to a small volume insufficient to cause cross turbulence of air-fuel stream in the intake passage, and the sum total area of the spaces is made not to exceed 30% of the total air intake area for the carburetor.

Another preferred device of the present invention comprises a peripheral wall defining an axial opening therein, which opening forms a part of the intake passage when the device is installed in the down-stream side of the carburetor. The peripheral wall has a series of small openings along the periphery thereof for communicating the intake passage with the atmosphere. The peripheral wall may be made of porous material or a perforated metal member, and the small openings may be formed by the pores of the porous material or by perforations through the perforated metal member. Each of the small openings restricts the introduction of air to a small volume insufficient to cause cross turbulence of air-fuel stream in the intake passage, and the sum total area of the small openings is made not to exceed 30% of the total air intake area for the carburetor.

As a modification of the device set forth above, a series of openings may be provided in the intake manifold itself.

The aforementioned and other objects and features of the present invention shall be described hereinafter in detail with reference to preferred embodiments thereof shown in the accompanying drawings, in which:

DESCRIPTION OF THE DRAWINGS

FIG. 1 is a partially exposed perspective view showing a device according to one embodiment of the present invention, FIG. 2 is a sectional view showing the device of FIG. 1 installed between a carburetor and an intake manifold, FIG. 3 is a partially exposed perspective view showing a device according to a second embodiment of the present invention.

DETAILED DESCRIPTION OF THE INVENTION

Figure 4:
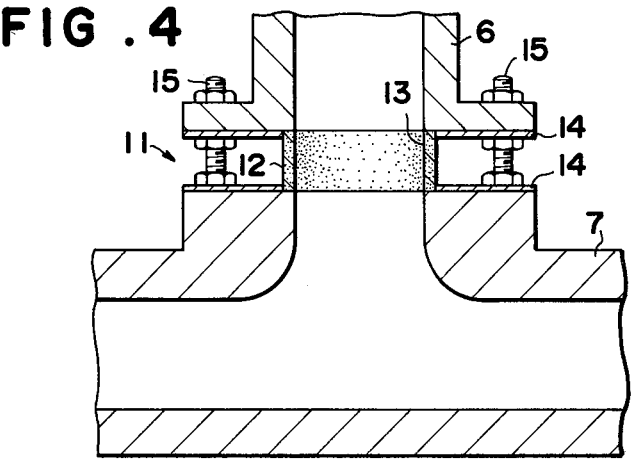
FIG. 4 is a sectional view showing the device of FIG. 3 installed between a carburetor and an intake manifold.

Referring to a first embodiment shown in FIGS. 1 and 2, a device 1 comprises four rectangular-shaped plates 2 stacked in layers with spacer members 3 such as washers at corners between each adjacent plates 2 to form spaces 4 of the same height between each adjacent plates 2. The washers 3 are also provided at corners on the uppermost plate 2a and under the lowermost plate 2b. Each plate 2 is provided with a circular opening 5 at the center portion thereof in such a manner that openings in each plate may be registered or aligned with each other when the plates are stacked as shown. The diameter of the opening 5 in the plates 2 is made substantially equal to that of the intake passage between a carburetor and an intake manifold. The plate 2 is also provided with holes at the corners and under which the washers 3 are provided. The holes at each corner of the stacked plates are registered with each other and with circular holes 3a in the washers 3, so that the device 1 can be installed between the carburetor 6 and the intake manifold 7 by bolts 8 penetrated through the registered holes in the plates 2 and washers 3.

With an arrangement set forth above, when the present device 1 is installed between the carburetor 6 and the intake manifold 7 by bolts 8 in such a manner that the registered center circular openings 5 in the plates 2 are registered with intake passages 9 and 10 of the carburetor 6 and the intake manifold 7, respectively, the registered circular openings 5 form a part of the intake passage which is communicated with combustion chambers in the internal combustion engine. The intake passage formed by the registered openings 5 in the stacked plates 2 is also communicated with the atmosphere through a series of narrow peripheral spaces 4, 4a and 4b between the stacked plates 2, between the lower end surface of the carburetor 6 and the uppermost plate 2a, and between the lowermost plate 2b and the upper end surface of the intake manifold 7, respectively.

It should be pointed out that each of the spaces 4, 4a and 4b formed by the present device is very small. The maximum critical size or width of each of the spaces allowed for the smooth running of the engine may vary in accordance with the performance of the engine but should be such as not to cause cross turbulence of the air-fuel stream flowing through the intake passage in a specified engine. Generally, the critical width of the space will be less than 1 mm in most automobiles. It has been noted by the present applicant that where a series of peripheral spaces 4 are formed by stacking the plates 2 with the width of each space being fairly below the critical value, the sum total area of the spaces so formed by the plates can be much greater than the area permissible when only one slot is used, and that for the smooth running of the engine, the sum total area of the peripheral spaces 4, 4a and 4b formed by the stacked plates 2 should preferably be in the range of 20-30% of the total air intake area for the carburetor. Also, it is preferable that the air spaces 4, 4a and 4b so formed be of equal width all around the periphery of the intake passage in the manifold.

A device of the type shown in FIG. 1 was subjected to tests by using a 1600 cc Isuzu Florian. In the tests it was designed in the first place to form a single peripheral space between a carburetor and an intake manifold by using a single spacer member. In such a test it could be noted that the maximum critical width of the space permissible for the running of the engine was 0.34mm. That is, when the width of the space exceed 0.34 mm, the engine could not be started. In the case of the single peripheral space thus formed, some additional air is admitted into the air-fuel stream in the intake passage, but as the space width is quite small the amount of air which can be admitted is small and insufficient to make a marked difference to the performance of the engine, although some difference in performance is noticeable.

In the successive tests, it could be noted that when a series of peripheral spaces 4, 4a and 4b were formed by keeping the width of each space below the critical value, the performance of the engine was remarkably improved. Further, for the high performance and smooth running of the engine, it was desired that the sum total area of the spaces 4, 4a and 4b formed by the stacked plates be in the range of 20-30% of the total air intake area for the carburetor. In this manner sufficient air could be introduced into the air-fuel stream to obtain a high percentage of fuel combustion and accordingly a low level of carbon monoxide CO and hydrocarbon HC was emitted from the engine exhaust.

The optimum running condition of the engine could be obtained when nine plates 2 are stacked in layers to form ten spaces 4, 4a and 4b with the width of each space being about 0.17m. In this optimum condition the sum total area of the spaces formed by the stacked plates was equal to about 25% of the total air intake area for the carburetor.

Referring now to a second embodiment of the present invention shown in FIGS. 3 and 4, a device 11 comprises a cylindrical body 12 made of porous material such as sintered metal particles, gypsum, etc.. The cylindrical body 12 is provided with a bore 13 along the axial center thereof, which bore forms a part of the intake passage between the carburetor 6 and the intake manifold 7 when the device is installed therebetween by mounting plates 14 and bolts 15 as shown in FIG. 4. The porosity of the porous material which forms the cylindrical body may be varied in accordance with the size and performance of the internal combustion engines but must be so small as not to cause cross turbulence of the air-fuel stream in the intake passage between the carburetor and the intake manifold 7 in a specified engine. Further, for the smooth running and high performance of the engine, the sum total area of the pores in the porous material which communicate the intake passage with the atmosphere should be in the range of 20-30% of the total air intake area for the carburetor 6.

Similar to the first embodiment, in the device 11 of the second embodiment shown in FIGS. 3 and 4 sufficient air can be introduced into the air-fuel stream to obtain a high percentage of fuel combustion and accordingly a low level of carbon monoxide CO and hydrocarbon HC is emitted from the engine exhaust.

Figure 5:
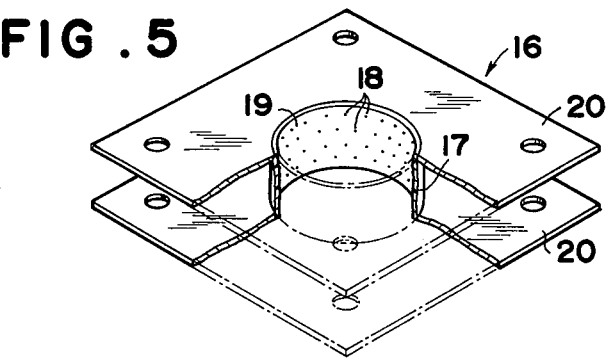
FIG. 5 is a partially exposed perspective view showing a device according to a third embodiment of the present invention.
Figure 6:
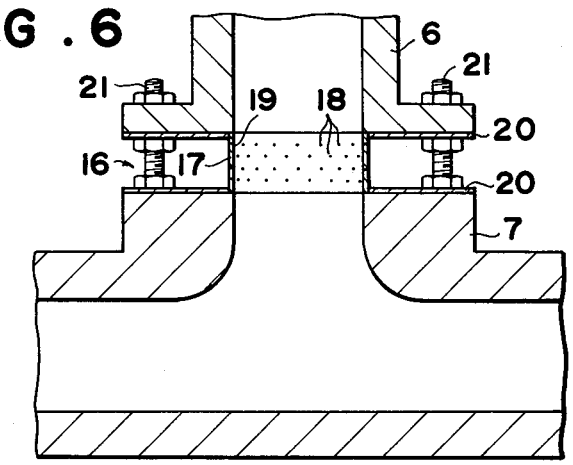
FIG. 6 is a sectional view showing the device of FIG. 5 installed between a carburetor and an intake manifold.

Referring to a third embodiment of the present invention shown in FIGS. 5 and 6, a device 16 comprises a cylindrical wall member 17 provided with a series of small holes 18 therethrough. The cylindrical wall member defines an axial bore 19 therein which forms a part of the intake passage between the carburetor 6 and the intake manifold 7 when the device 16 is installed therebetween by mounting plates 20 and bolts 21 as shown in FIG. 6. The holes 18 through the cylindrical wall member 17 are distributed with substantially uniform density along the periphery thereof. The size or diameter of each of the holes may be varied in accordance with the size and performance of the internal combustion engines but must be so small as not to cause cross turbulence of the air-fuel stream in the intake passage between the carburetor and the intake manifold in a specified engine. Preferably, the diameter of each hole is kept 1 mm in most automobiles. Further, for the smooth running and high performance of the engine, it is pointed out that the sum total area of the holes 18 in cylindrical wall member 17 should be in the range of 20–30% of the total air intake area for the carburetor.

In tests of the device according to the third embodiment, it could be noted that when a single 3 mm round air hole was formed to introduce additional air into the intake passage therethrough, the engine could not be started. However, when a series of holes each having a diameter of about 0.3 mm are formed along the periphery of the intake manifold, with the sum total area of the holes of at least six times that of the 3 mm round single hole, the engine ran smoothly and starting was instantaneous. Thus, the device 16 of the third embodiment allows sufficient air to be introduced into the air-fuel stream to obtain a high percentage of fuel combustion and accordingly a low level of carbon monoxide CO and hydrocarbon HC is emitted from the engine exhaust.

Although the present invention has been described with reference to the preferred embodiments thereof, many modifications and alterations may be made. For example, as modifications of the first embodiment shown in FIGS. 1 and 2, a series of narrow vertical spaces may be formed by disposing a series of spaced plates vertically and radially to define an axial bore at the inner ends of the plates in such a manner that the axial bore can form a part of the intake passage between the carburetor and the intake manifold. The series of plates may further be disposed angularly to define the axial bore at the inner ends of the plates and thereby to form angular spaces in communication with the axial bore.

Further, as modifications of the third embodiment, the cylindrical wall member 17 may be provided with small openings of any other shapes such as slotted holes.

However, it should be noted in any of the modifications set forth above that the each space or opening be narrow or small enough not to cause cross turbulence of the air-fuel stream in the intake passage and that the total sum area of the spaces or openings be made not to exceed 30% of the total air intake area for the carburetor and, preferably, in the range of 20–30%.

What I claim is:

1. A device for introducing additional air into an air-gas mixture flowing through an intake passage from a carburetor to combustion chambers of an internal combustion engine, said device comprising:
    a member adapted to be mounted between the carburetor and combustion chambers;
    said member having extending therethrough a center opening forming a portion of the intake passage when said member is so mounted, said center opening being no greater in size than the intake passage;
    a plurality of space means, extending through said member peripherally of said center opening, for, when said member is so mounted, communicating the atmosphere with said center opening and for thus introducing additional air from the atmosphere to the air-gas mixture in the intake passage; and
    each said space means having a size below that critical value which would allow the additional air passing therethrough to cause cross turbulence in the air-gas mixture passing through the intake passage, when said member is so mounted.

2. A device as claimed in claim 1, wherein said size of each said space means is non-adjustable.

3. A device as claimed in claim 1, wherein the sum of the total area of said space means does not exceed 30% of the total air intake area for the carburetor.

4. A device as claimed in claim 1, wherein said space means comprise spaced slots.

5. A device as claimed in claim 4, wherein each said slot has a width of less than 1 mm.

6. A device as claimed in claim 1, wherein said member comprises a plurality of spaced plates each having a center opening therethrough, and said space means comprise slot-shaped spaces between adjacent said plates, said slot-shaped spaces being of equal size and extending peripherally around the intake passage.

7. A device as claimed in claim 6, wherein the width of each said slot-shaped space formed between adjacent said plates is less than 1 mm.

8. A device as claimed in claim 1, wherein said member comprises a cylindrical wall member, and said space means comprise a plurality of holes extending through said wall member.

9. A device as claimed in claim 8, wherein said holes are substantially uniformly distributed around the periphery of said wall member.

10. A device as claimed in claim 8, wherein each said hole is substantially round and has a diameter less than 1 mm.

11. A device as claimed in claim 1, wherein said member comprises a cylindrical body made of porous material, and said space means comprise pores in said body.

12. In an internal combustion engine of the type including combustion chambers, a carburetor, an intake passage extending between said carburetor and said combustion chambers for passing an air-gas mixture therebetween, and means for introducing additional air into said mixture flowing through said intake passage, the improvement wherein said additional air introducing means comprises:
    a member mounted between said carburetor and said combustion chambers;
    said member having extending therethrough a center opening forming a portion of said intake passage, said center opening being no greater in size than said intake passage;
    a plurality of space means, extending through said member peripherally of said center opening, for communicating the atmosphere with said center opening and for thus introducing additional air from the atmosphere to said air-gas mixture in said intake passage; and each said space means having a size below that critical value which would allow the additional air passing therethrough to cause cross turbulence in said air-gas mixture passing through said intake passage.

13. The improvement claimed in claim 12, wherein said size of each said space means is non-adjustable.

14. The improvement claimed in claim 12, wherein the sum of the total area of said space means does not exceed 30% of the total air intake area for said carburetor.

15. The improvement claimed in claim 12, wherein said space means comprise spaced slots.

16. The improvement claimed in claim 15, wherein each said slot has a width of less than 1 mm.

17. The improvement claimed in claim 12, wherein said member comprises a plurality of spaced plates each having a center opening therethrough, and said space means comprise slot-shaped spaces between adjacent said plates, said slot-shaped spaces being of equal size and extending peripherally around said intake passage.

18. The improvement claimed in claim 17, wherein the width of each said slot-shaped space formed between adjacent said plates is less than 1 mm.

19. The improvement claimed in claim 12, wherein said member comprises a cylindrical wall member, and said space means comprise a plurality of holes extending through said wall member.

20. The improvement claimed in claim 19, wherein said holes are substantially uniformly distributed around the periphery of said wall member.

21. The improvement claimed in claim 19, wherein each said hole is substantially round and has a diameter less that 1 mm.

22. The improvement claimed in claim 12, wherein said member comprises a cylindrical body made of porous material, and said space means comprise pores in said body.

* * * * *